US011929553B2

(12) United States Patent
Shammas et al.

(10) Patent No.: US 11,929,553 B2
(45) Date of Patent: Mar. 12, 2024

(54) MECHANICALLY RECONFIGURABLE ANTENNA BASED ON MOIRE PATTERNS AND METHODS OF USE

(71) Applicant: American University of Beirut, Beirut (LB)

(72) Inventors: Elie Shammas, San Diego, CA (US); Joseph Costantine, Albuquerque, NM (US); Joe Taoum, Beirut (LB)

(73) Assignee: American University of Beirut, Beirut (LB)

( * ) Notice: Subject to any disclaimer, the term of this patent is extended or adjusted under 35 U.S.C. 154(b) by 0 days.

(21) Appl. No.: 17/714,564

(22) Filed: Apr. 6, 2022

(65) Prior Publication Data

US 2022/0328979 A1 Oct. 13, 2022

Related U.S. Application Data

(60) Provisional application No. 63/172,952, filed on Apr. 9, 2021.

(51) Int. Cl.
*H01Q 3/44* (2006.01)
*H01Q 19/06* (2006.01)

(52) U.S. Cl.
CPC ............... *H01Q 19/06* (2013.01); *H01Q 3/44* (2013.01)

(58) Field of Classification Search
CPC .................................. H01Q 3/44; H01Q 3/46
See application file for complete search history.

(56) References Cited

U.S. PATENT DOCUMENTS

| | | | |
|---|---|---|---|
| 6,812,903 B1 * | 11/2004 | Sievenpiper ......... | H01Q 15/002 343/753 |
| 7,952,533 B2 | 5/2011 | Hur et al. | |
| 8,797,221 B2 | 8/2014 | Cetiner et al. | |
| 9,379,449 B2 | 6/2016 | Cetiner et al. | |
| 10,700,429 B2 | 6/2020 | Mehdipour et al. | |
| 10,700,436 B2 | 6/2020 | Georgakopoulos et al. | |
| 2007/0177131 A1 | 8/2007 | Hansen | |
| 2007/0284527 A1 | 12/2007 | Zani et al. | |
| 2008/0055188 A1 * | 3/2008 | Lynch ...................... | H01Q 3/46 343/753 |
| 2009/0051620 A1 | 2/2009 | Ishibashi et al. | |
| 2015/0372390 A1 | 12/2015 | Gregoire | |
| 2019/0217908 A1 | 7/2019 | Hawkes et al. | |

FOREIGN PATENT DOCUMENTS

| | | |
|---|---|---|
| WO | 1987/001243 A1 | 2/1987 |
| WO | 2019/157567 A1 | 8/2019 |
| WO | WO-2020182306 A1 * | 9/2020 |

OTHER PUBLICATIONS

International Searching Authority/USPTO, International Search Report and Written Opinion issued in corresponding application PCT/US2022/023643 dated Jul. 26, 2022 (8 pages).

(Continued)

*Primary Examiner* — Daniel Munoz
(74) *Attorney, Agent, or Firm* — J. Peter Paredes; Amin Talati Wasserman LLP

(57) ABSTRACT

Disclosed herein are reconfigurable antennas based on moiré patterns with new actuation mechanisms to reduce their energy expenditure.

10 Claims, 19 Drawing Sheets

(56) References Cited

OTHER PUBLICATIONS

Mcguyer, B. H. et al., "Connection between antennas, beam steering, and the moire effect", arxiv.org, Feb. 21, 2022, retrieved on Jun. 3, 2022. Retrieved from the Internet <URL: https://arxiv.org/pdf/2107.05571.pdf>, 13 pages.
Liu, X. et al. "Analysis of a Packable and Tunable Origami Multi-Radii Helical Antenna", IEEE Access, 2019, 7: 13003-13014.
Tawk, Y. "Physically controlled cubesat antennas with an adaptive frequency operation", IEEE Antennas and Wireless Propagation Letters, 2019, 18(9): 1892-1896.
Blumenschein, L.H. et al. "A tip-extending soft robot enables reconfigurable and deployable antennas", IEEE Robotics and Automation Letters, 2018, 3(2): 949-956.
Zhu, H. et al. "Frequency-Reconfigurable Antenna Using Metasurface", IEEE Transactions on Antennas and Propagation, 2013, 62(1): 80-85.
Zhu, H.L. et al. "Mechanically pattern reconfigurable antenna using metasurface", IET Microwaves, Antennas & Propagation, 2015, 9(12): 1331-1336.
Rodrigo, D. et al. "Circular Beam-Steering Reconfigurable Antenna With Liquid Metal Parasitics", IEEE transactions on antennas and propagation, 2012, 60(4): 796-1802.
Mehdipour, T.A. et al. "Mechanically reconfigurable antennas using an anisotropic carbon-fibre composite ground", ET Microwaves, Antennas & Propagation, 2013, 7(13): 1055-1063.
Boukarkar, A. et al. "Compact mechanically frequency and pattern reconfigurable patch antenna," IET Microwaves, Antennas & Propagation, 2018, 12(11): 1864-1869.

* cited by examiner 15 deg 0 deg 45 deg 30 deg

Normalized Simulated & Experimental Radiation Pattern of CP Antenna @ 0 deg

Normalized Simulated & Experimental Radiation Pattern of CP Antenna @ 0 deg

100

0 deg 15 deg 30 deg 45 deg

MECHANICALLY RECONFIGURABLE ANTENNA BASED ON MOIRE PATTERNS AND METHODS OF USE

CROSS-REFERENCE TO RELATED APPLICATIONS

The present application claims priority to U.S. provisional application Ser. No. 63/172,952 filed Apr. 9, 2021, herein incorporated by reference in its entirety.

BACKGROUND

The invention generally relates to antennas, and in particular to a mechanically reconfigurable antenna capable of tuning its parameters with minimum required power, by relying on interference patterns. However, designing mechanically reconfigurable antennas with low power consumption and within a confined volume is still a challenging task.

Recently, new methods were attempted to modify the characteristics of an antenna through mechanical reconfiguration. For example, the operating frequency of a helical antenna was tuned by mounting it to a height-adjustable origami structure [1] or by physically changing the number of turns of the helix by using hollow helical tubes containing movable arms [2]. Another design relies on soft robotics, where an inflatable pneumatic structure carrying copper strips acts as a monopole [3]. On the other hand, placing movable parasitic patches or rotating metasurfaces on top of an antenna were successful in changing the frequency of operation of the antenna at hand [4]. As for pattern reconfiguration, the idea of metasurfaces was also explored to achieve beam steering capabilities [5].

Similarly, a liquid metal was used as a director and reflector to steer the radiating beam [6]. Other methods to alter the antenna's radiation pattern include replacing the ground plane of the antenna by a rotating anisotropic carbon fiber plane [7] or inserting shorting screws between the patch antenna and its ground [8].

However, in most of the applications, antennas are integrated in devices with limited power supply. Satellites, cellphones, and other electronic devices draw power from a battery, which emphasizes on the importance of energy consumption of each component. Designing mechanically reconfigurable antennas with minimal power consumption is still a challenging task due to the presence of traditional actuators.

The present invention attempts to solve these problems as well as others.

SUMMARY OF THE INVENTION

Provided herein are systems, methods and apparatuses for a reconfigurable moiré pattern antennae.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

BRIEF DESCRIPTION OF THE DRAWINGS

In the accompanying figures, like elements are identified by like reference numerals among the several preferred embodiments of the present invention.

DETAILED DESCRIPTION OF THE INVENTION

Figures 1A, 1B, 1C, 1D:
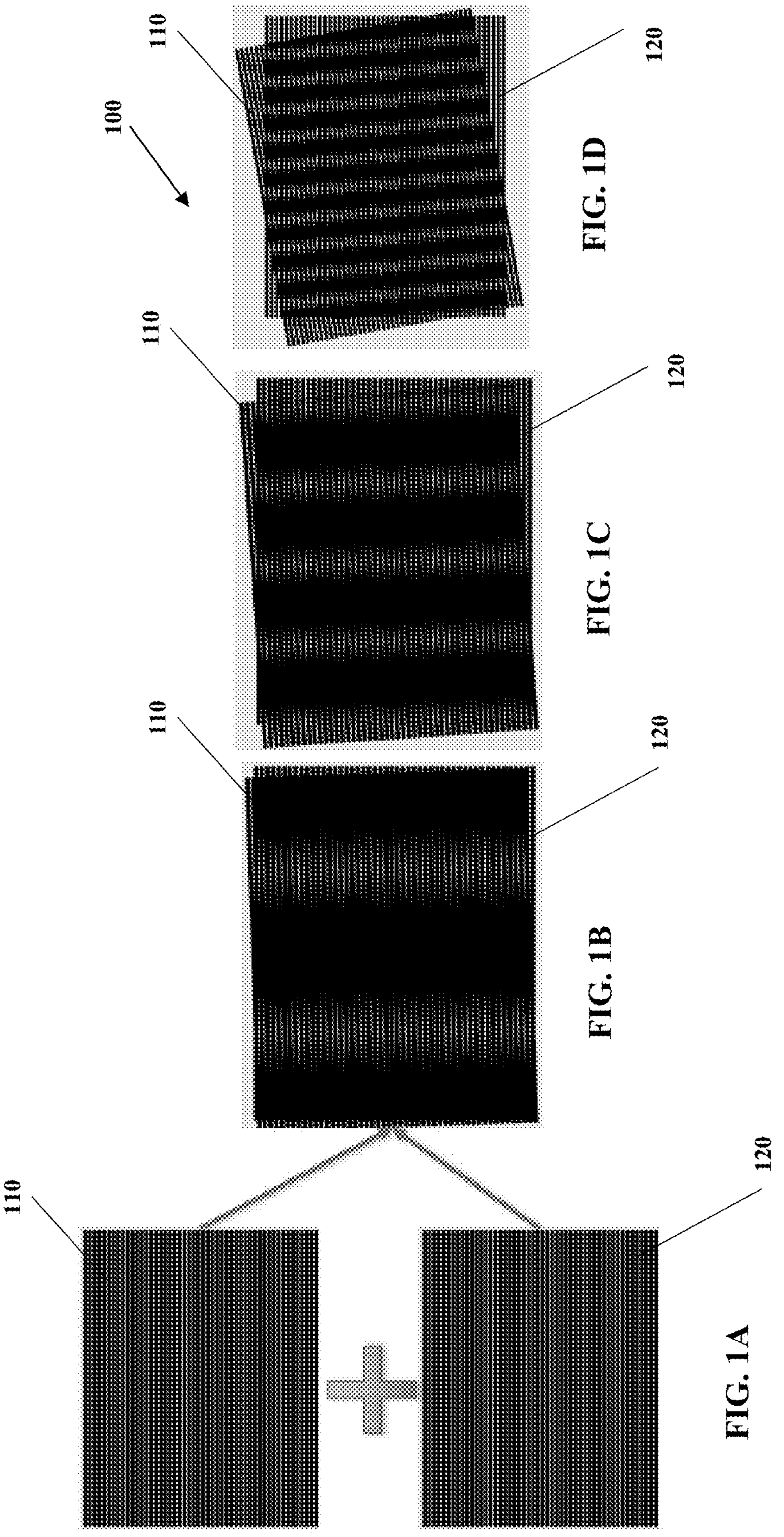
FIGS. 1A-1D are top views of an example of interference patterns created by rotating two superposed arrangements of horizontal strips.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The words proximal and distal are applied herein to denote specific ends of components of the instrument described herein. A proximal end refers to the end of an instrument nearer to an operator of the instrument when the instrument is being used. A distal end refers to the end of a component further from the operator and extending towards the surgical area of a patient and/or the implant.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Generally speaking, a mechanically reconfigurable antenna comprises low energy expenditure, a moiré pattern, and low power actuation mechanisms. The intersection of repeated patterns creates the moiré effect responsible of altering the antenna's characteristics including, but not limited to, tuning the operating frequency between about 100 mHz and orders of GHz, changing the radiation pattern, and altering the antenna's polarization between an elliptical, linear, and circular polarization. The radiation patterns are directive radiation patterns of a typical patch antenna. The altering of the antenna's characteristics may be employed for dynamic adaptation to changes in a communications channel or in system requirements. Characteristics of the radiated beam are altered without the need of multiple stand-alone antennas.

A non-linear relation exists between the mechanical motion and the antenna's reconfiguration, where a small mechanical motion creates geometric variations that significantly change the antenna's characteristics. In one embodiment, at least a 5 degree of rotation changes the polarization of the antenna or reconfigure its radiation pattern. The rotational changes may allow for continuous steering of the radiation pattern of the reconfigurable antenna with fine tuning over a 360° range.

The relative movement of the moiré patches is obtained by at least one mechanism that ensure minimal energy consumption. In one embodiment, the relative movement of the moiré patch is by a ratchet mechanism driven by a shape memory alloy actuator.

Generally speaking, the mechanically reconfigurable patch antenna system comprises: at least two repeated patterns whose superposition creates a moiré effect; an actuation mechanism operably coupled to at least one repeated pattern; and a supporting structure operably coupled with the actuation mechanism. The actuation mechanism creates a small mechanical motion to impart geometric variations in the repeated patterns that significantly change the antenna's characteristics. In one embodiment, a 5 degree rotation can change the polarization of the antenna or reconfigure its radiation pattern. The repeated pattern is operably coupled to patch antenna, which is of any shape, dimension, and frequency band.

The repeated unit can be of any form and dimension. The repeated patterns can be formed using a single or multiple patches (two or more patches). The patches of the repeated patterns can be of any form and any dimension. The patches of the repeated patterns can be of metallic or non-metallic nature. The patches of the repeated patterns can be of conductive or non-conductive nature. The patch can be a layered superposition of two different materials. The union pattern can be obtained by rotation, translation, or any other transformation applied on the patches.

The supporting structure can be of any material, including but not limited to, plastic, nylon, and foam. Any of the antenna's parameter can be modified, including but not limited to, its operating frequency, bandwidth, radiation pattern, polarization, or any of their combinations. The antenna is used in any telecommunication application. That includes and not restricted to WIFI, Bluetooth, LTE, satellite to satellite communication, satellite to Earth communication, wireless media, or any space communication systems.

As shown in FIGS. 1A-1D, the superimposed repeated moiré pattern 100 comprises a first superposed layer 110 and a second superposed layer 120, wherein the first superposed layer 110 is moveable relative to the second superposed layer 120, or the second superposed layer 120 is moveable relative to the first superposed layer 110. The embodiment in FIGS. 1A-1D, the first superposed layer 110 is rotatable relative to the second superposed layer 120. The first superposed layer 110 and the second superposed layer 120 may be identical and include a pattern, which can be grids, stripes, circles, dots of any shape, triangles, quadrilaterals, diagonal lines, waving lines, or any other polygonal shape. The first superposed layer and the second superposed layer include a pattern of a plurality of horizontal lines separated by a distance D1 and including a width W1. The distance D1 is between about 1.0 mm and about 15 mm, and the distance W1 is between about 1.0 mm and about 15 mm. In one embodiment, distance D1 is equal to width W1. In other embodiments, distance D1 is not equal to width W1. The values for D1 and W1 are related to the antenna design and the manufacturing processes, according to one embodiment.

Figures 2A, 2B, 2C:
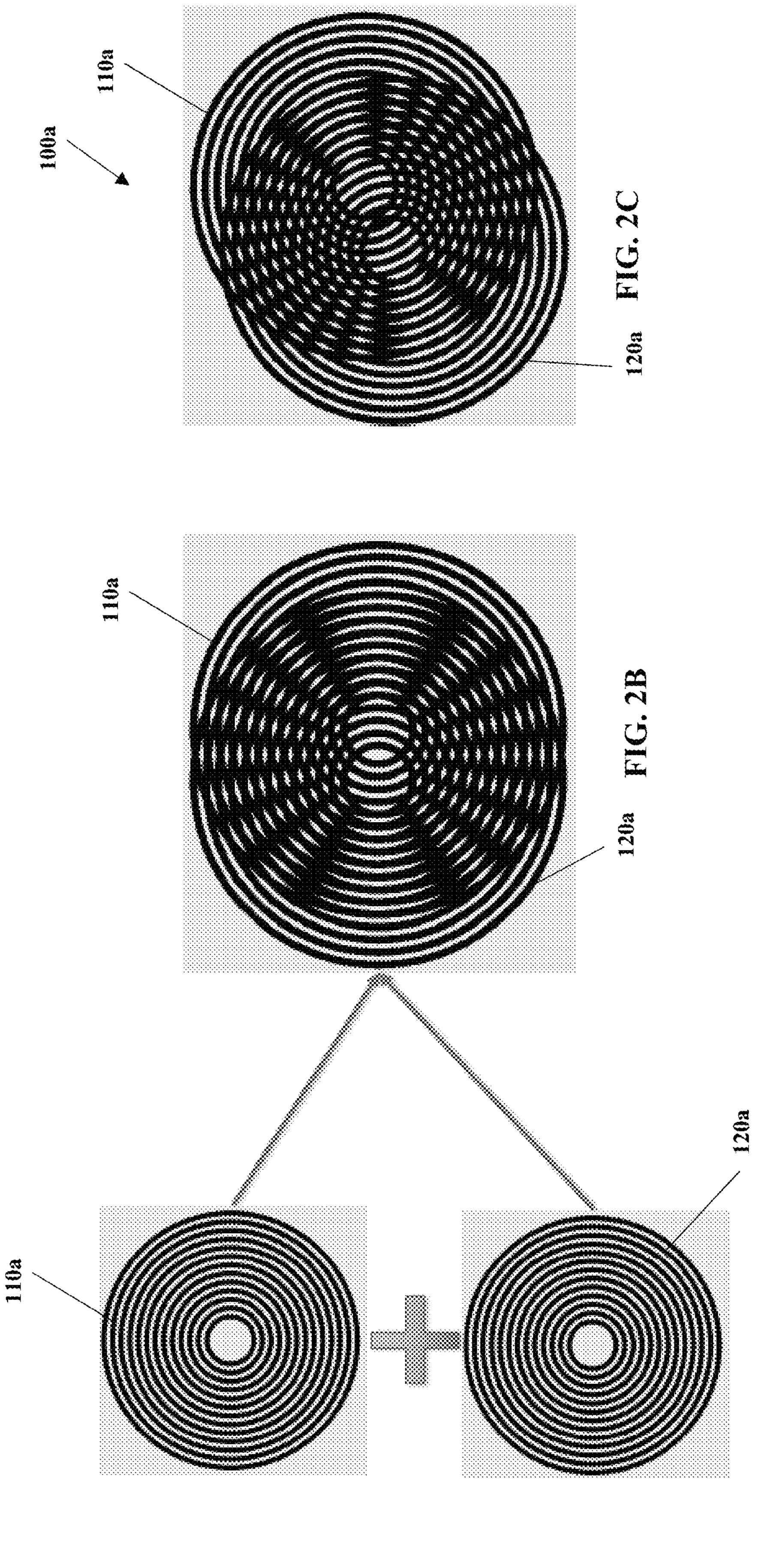
FIGS. 2A-2C are top views of an example of interference patterns created by translating two superposed arrangements of circular strips.

As shown in FIGS. 2A-2C, the superimposed repeated circular moiré pattern 100*a* comprises a first circular superposed layer 110*a* and a second circular superposed layer 120*a*, wherein the first circular superposed layer 110*a* is moveable relative to the second circular superposed layer 120*a*, or the second circular superposed layer 120*a* is moveable relative to the first circular superposed layer 110*a*. The embodiment in FIGS. 2A-2C, the first circular superposed layer 110*a* is displaced along the y-axis or x-axis relative to the second circular superposed layer 120*a*. The first circular superposed layer 110*a* and a second circular superposed layer 120*a* include a plurality of circles including a width W2 and the plurality of circles are separated by a distance D2. The distance D2 is between about 1.0 mm and about 15 mm, and the width W2 is between about 1.0 mm and about 15 mm. In one embodiment, distance D2 is equal to width W2. In other embodiments, distance D2 is not equal to width W2. The values for D2 and W2 are related to the antenna design and the manufacturing processes, according to one embodiment.

Figure 3C:
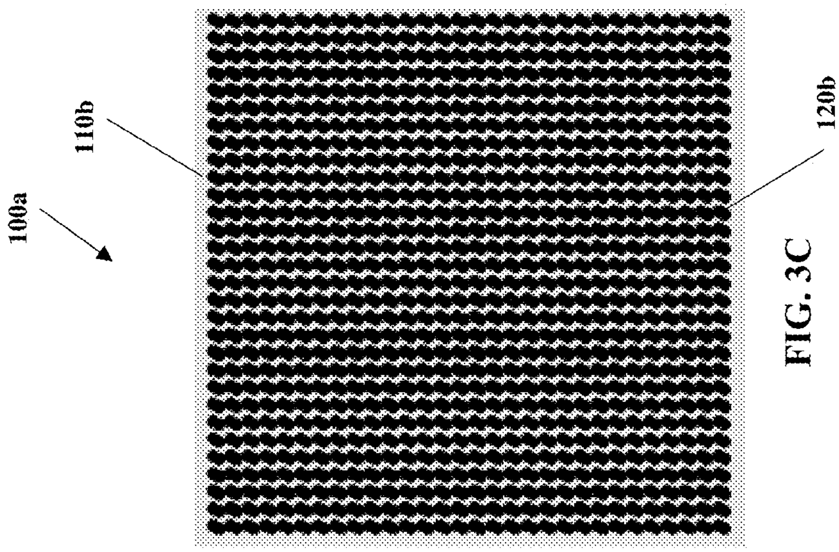
FIGS. 3A-3C are top views of an example of interference patterns created by translating two superposed arrangements of circular dots.
Figure 3B:
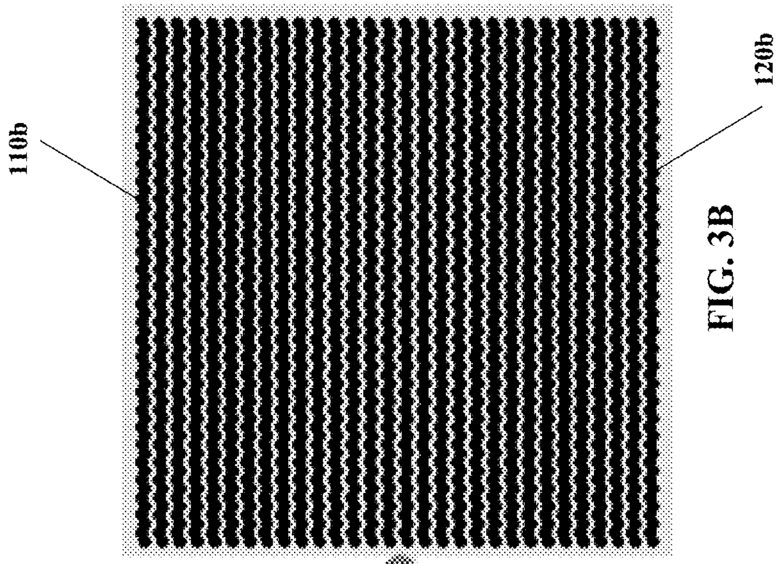
Figure 3A:
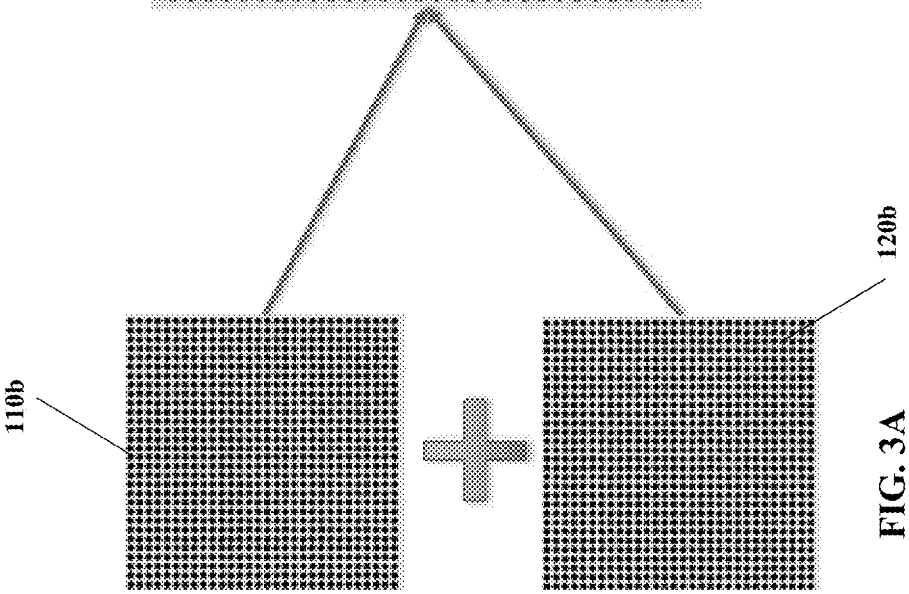
Figures 4A, 4B, 4C, 4D, 4E:
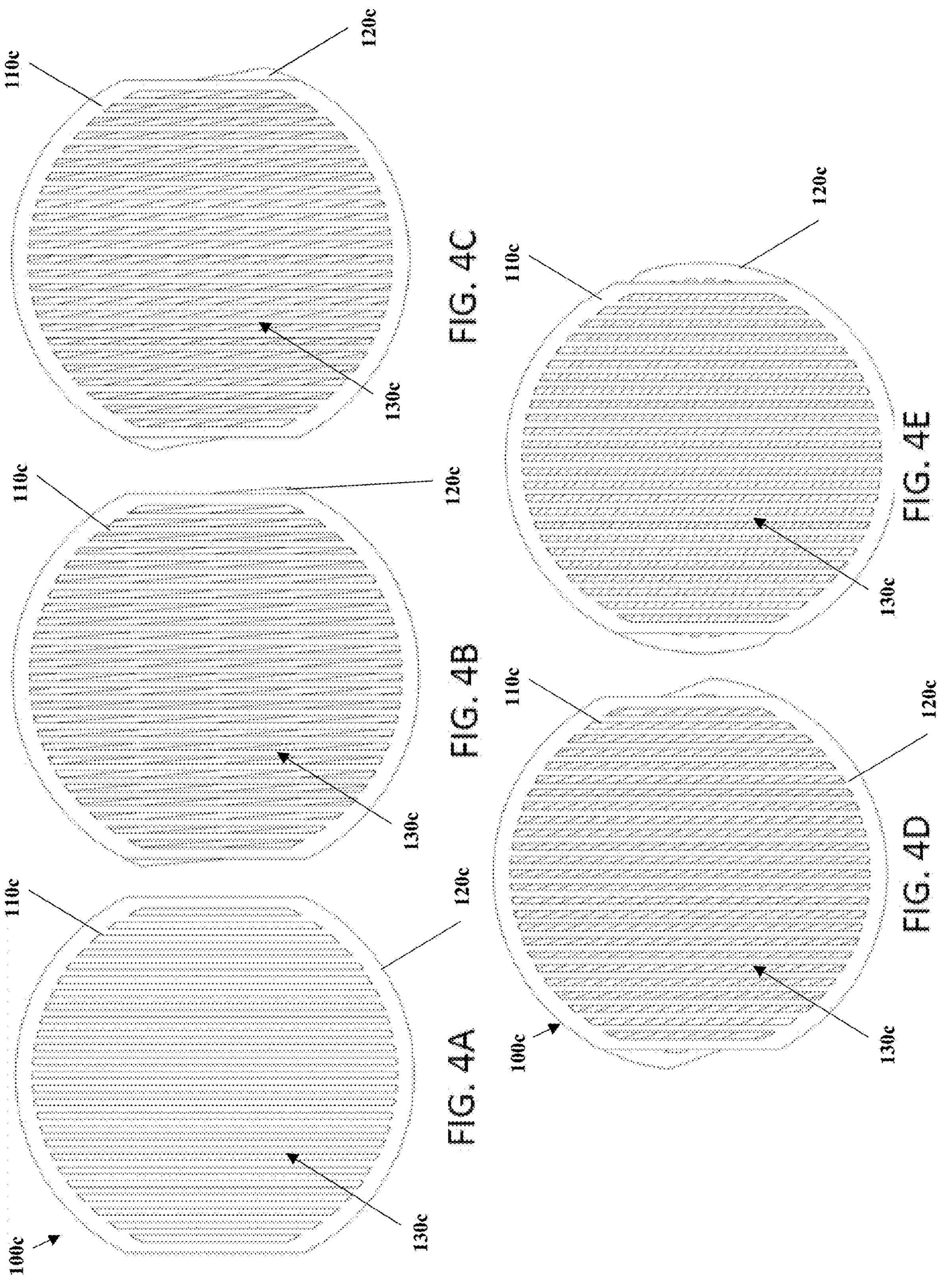
FIGS. 4A-4E are top views of an embodiment of interference patterns by rotating two circular metallic patches by 0 deg, 5 deg, 10 deg, 20 deg, and 45 deg, respectively, thus creating moiré patterns.

As shown in FIGS. 3A-3C, the superimposed repeated circular dot moiré pattern 100*b* comprises a first circular dot superposed layer 110*b* and a second circular dot superposed layer 120*b*, wherein the first circular dot superposed layer 110*b* is moveable relative to the second circular dot superposed layer 120*b*, or the second circular dot superposed layer 120*b* is moveable relative to the first circular dot superposed layer 110*b*. The embodiment in FIGS. 3A-3C, the first circular dot superposed layer 110*b* is displaced along the y-axis or x-axis relative to the second circular dot superposed layer 120*b*. The first circular dot superposed layer 110*b* and the second circular dot superposed layer 120*b* include a plurality of circle dots including a diameter W3 and the plurality of circle dots are separated by a distance D3. The diameter W3 is between about 1.0 mm and about 15 mm, and the distance D3 is between about 1.0 mm and about 15 mm. In one embodiment, distance D3 is equal to diameter W3. In other embodiments, distance D3 is not equal to diameter W3. The values for D3 and W3 are related to the antenna design and the manufacturing processes, according to one embodiment.

A very small relative motion between the layers, whether a translation, rotation, or a combination of both, new visualized shapes in the overall superimposed repeated moiré pattern 100, as shown in FIG. 1D, FIG. 2C, and FIG. 3C. Rotational motion may be selected from about 1 degree to about 180 degrees. Translation motion may be elected from about 0.1 mm to about 10 mm in either x-axis or y-axis. Any of these shapes may be used in the proposed antenna system, depending on the reconfiguration requirements.

FIGS. 4A-4E is an embodiment of interference patterns for the moiré pattern antenna 100*c*. In this embodiment, a first circular patch 110*c* comprises a first metallic layer and second circular patch 120*c* comprises a second metallic layer, wherein the first metallic layer and the second metallic layer includes a plurality of parallel horizontal strips 130*c*. The moiré pattern 100*c* is obtained by rotating the first circular patch on top of a second circular patch, wherein the second circular patch is in a fixed position. In this embodiment, the patches are circular, and the rotation is increased from 0 degree as in FIG. 4A, to 5 degrees in FIG. 4B, to 10 degrees in FIG. 4C, to 20 degrees in FIG. 4D, to 45 degrees in FIG. 4E. The increase in the rotation may be by about 5 degree increments, about 10 degree increments, about 15 degree increments, about 20 degree increments, about 25 degree increments, or about 30 degree increments.

Figure 5B:
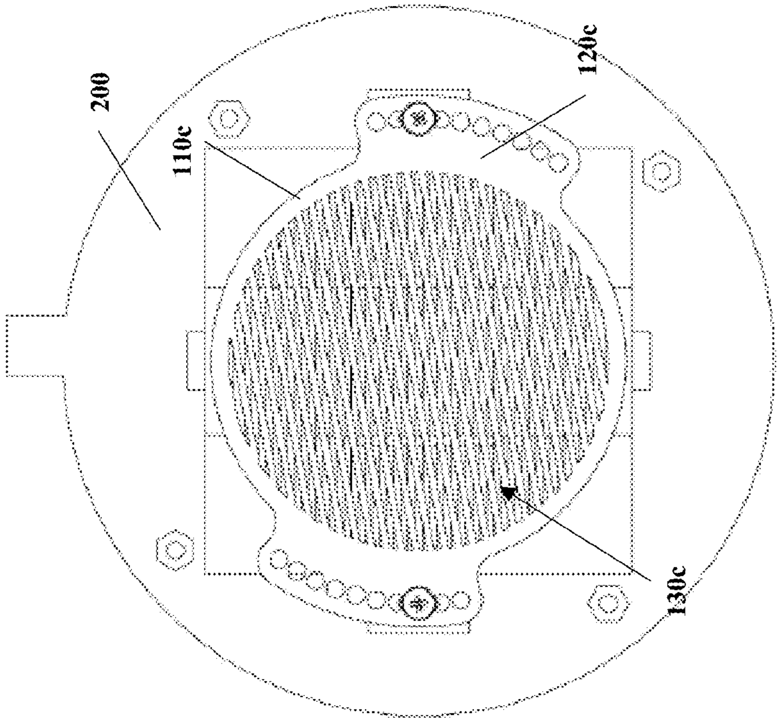
FIGS. 5A-5B are top views of an embodiment of a manually rotated moiré antenna at 0 deg and 10 deg, respectively.
Figure 5A:
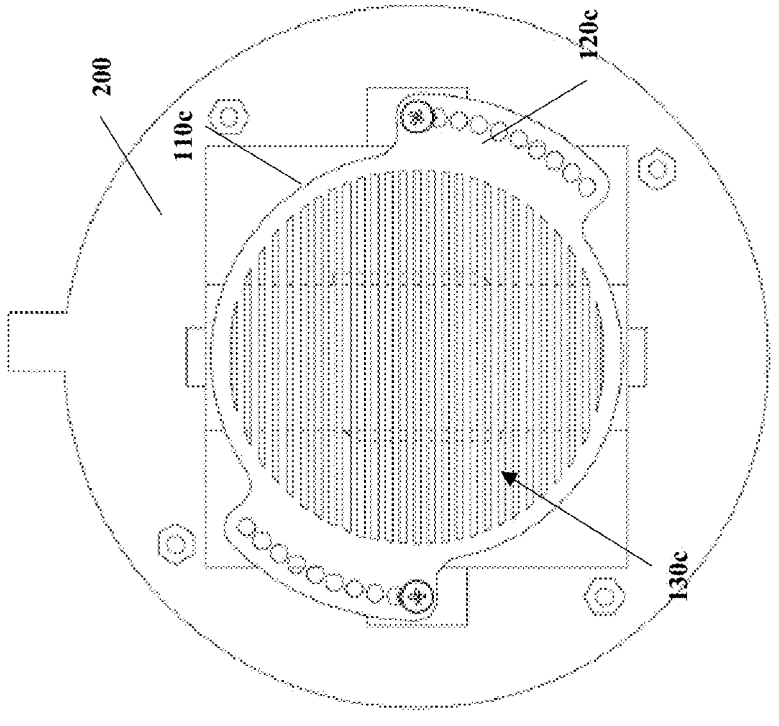
Figure 6B:
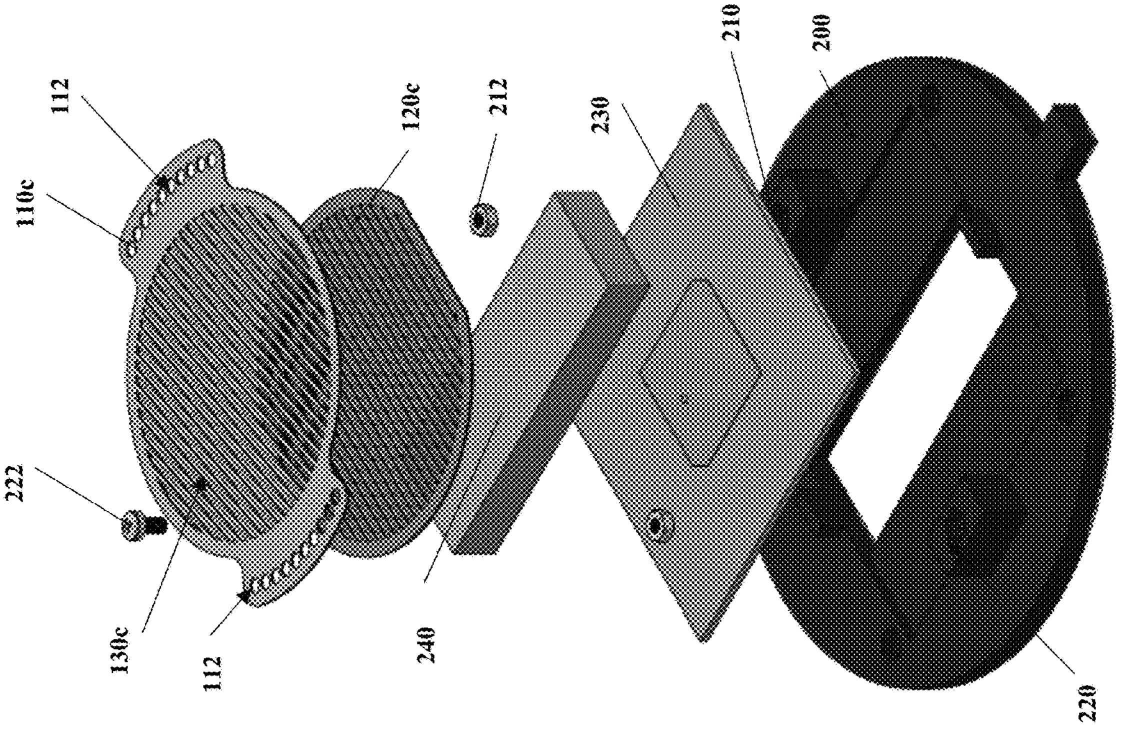
FIGS. 6A-B are exploded views showing the components of the manually rotated moiré antenna of FIG. 5.
Figure 6A:
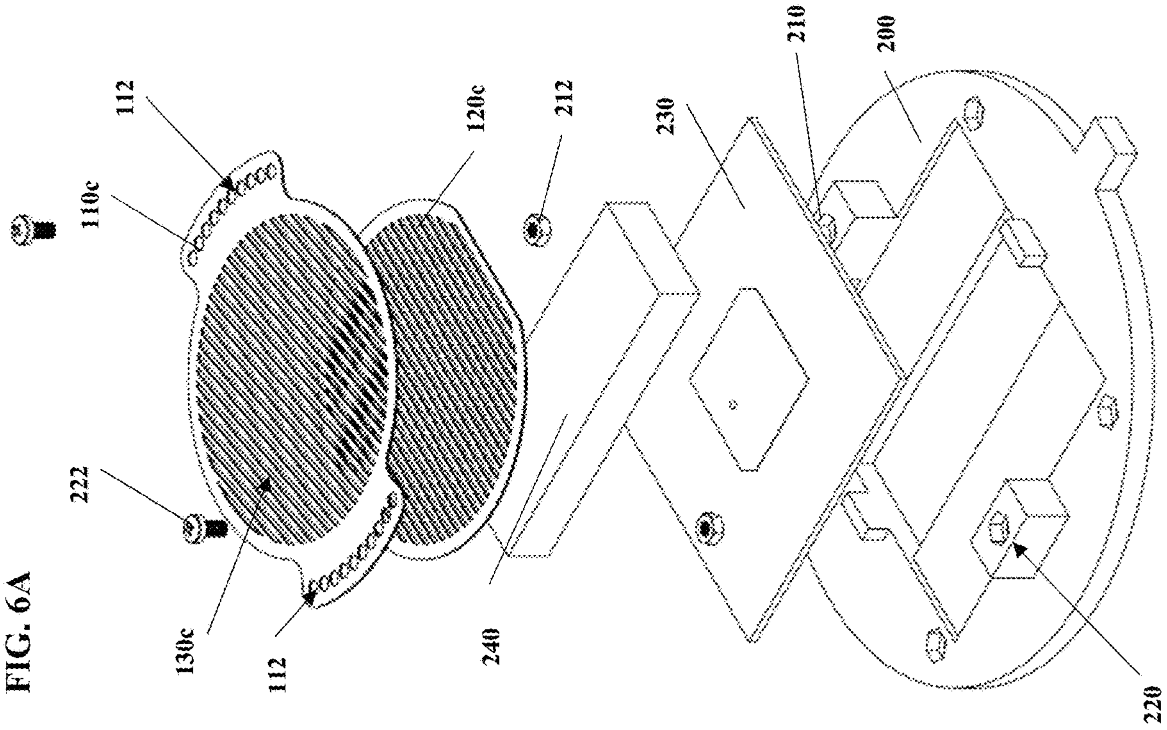

FIG. 5-6 are an embodiment of the invention, where moiré patches similar to FIG. 4 are incorporated into a base structure 200, to provide for the antenna functionality. A patch antenna 230 is coaxially fed to the circularly polarized patch antenna between a foam separator 240. In one embodiment, the patch antennae 230 is a circularly polarized patch antenna. In other embodiments, the patch antenna can be of any shape or dimensions in other embodiments. As shown in FIGS. 6A-6B, the base structure 200 includes a first opening 210 and a second opening 220. The first circular patch 110*c* includes a plurality of first openings 112 and a plurality of second openings 114. In one embodiment, the plurality of first openings 112 and the plurality of second openings 114 are spaced apart to permit at least a 5 degree rotation of the first circular patch 110*c*. The rotated first circular patch 110*c* is fastened the base structure 200 by a nylon nut 212 and screw 222 through the plurality of first openings 112 and the plurality of second openings 114. The nylon nut 212 and screw 222 are secured to the base structure 200 by the first opening 210 and the second opening 220 that approximates the dimensions of the nut 212. The base structure 200 permits about 5 deg rotations ranging from about 0 to about 45 degrees with at least 10 first openings 112 and at least 10 second openings 114. The plurality of openings 112 and 114 may range about 5 to about 20 openings to provide a greater or lesser degree of rotation of the first circular patch 110*c* depending on the desired antenna functionality.

Figure 7B:
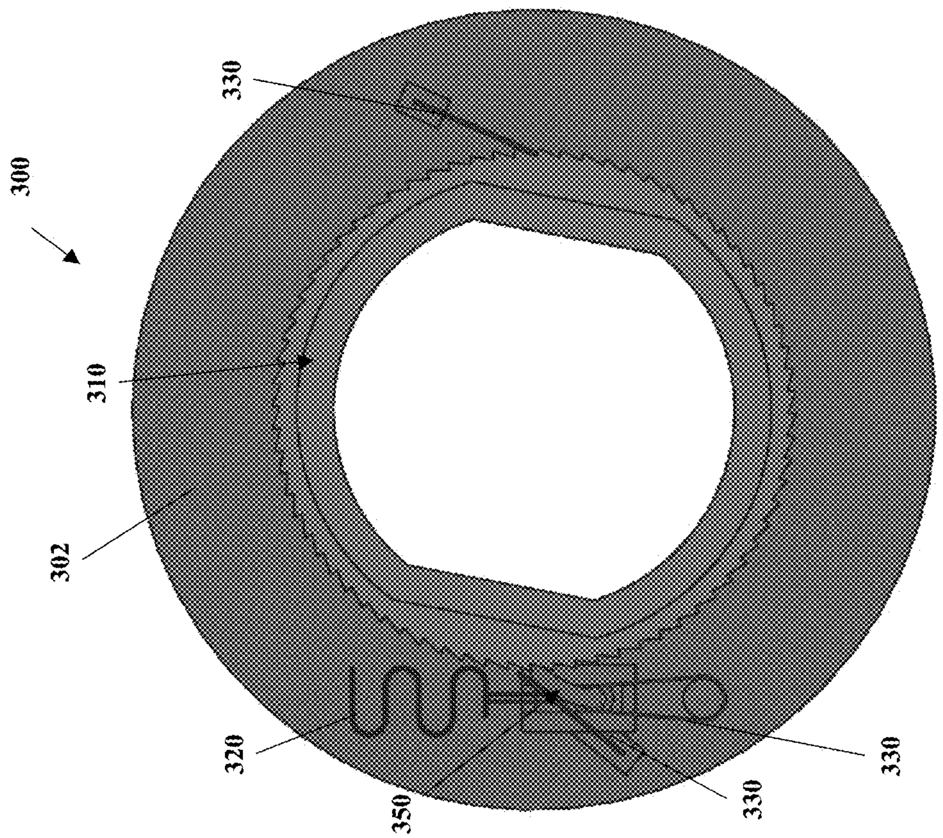
FIGS. 7A-B are top views of an embodiment of the low energy actuation system using a shape memory alloy actuation and a ratchet mechanism.
Figure 7A:
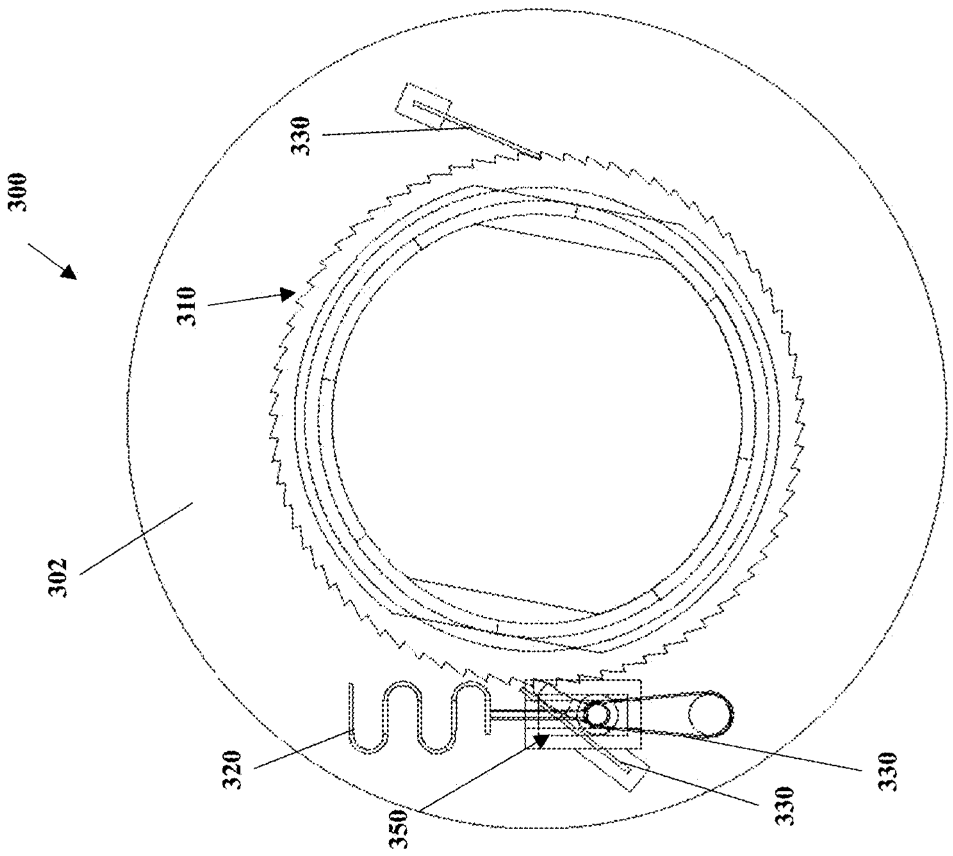
Figure 8B:
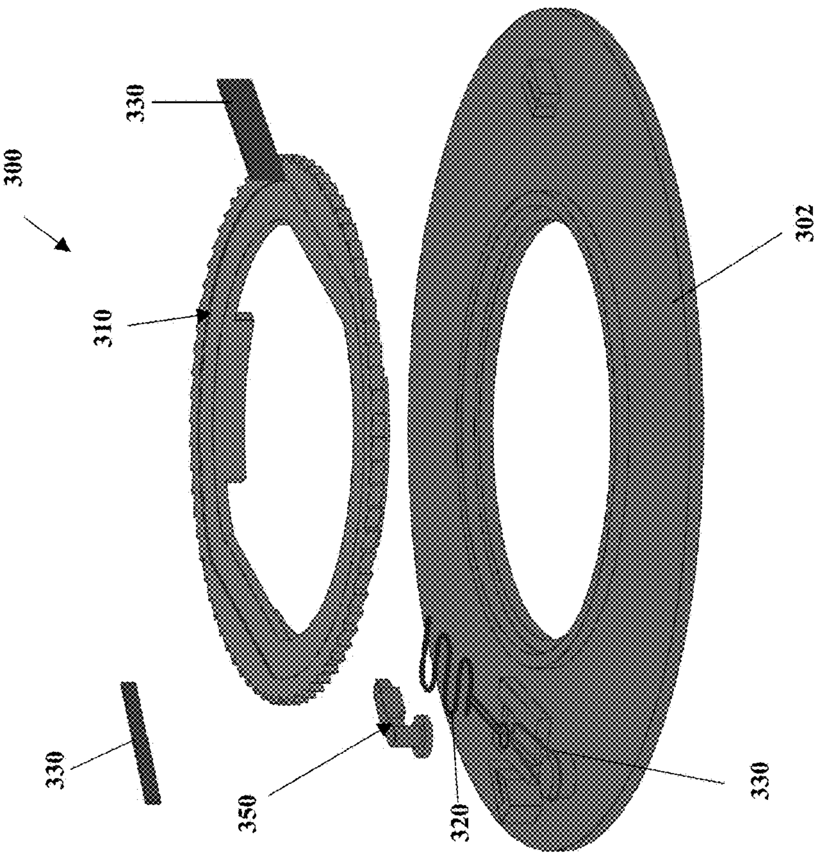
FIGS. 8A-B are exploded views showing the components of the actuation mechanism of FIG. 7.
Figure 8A:
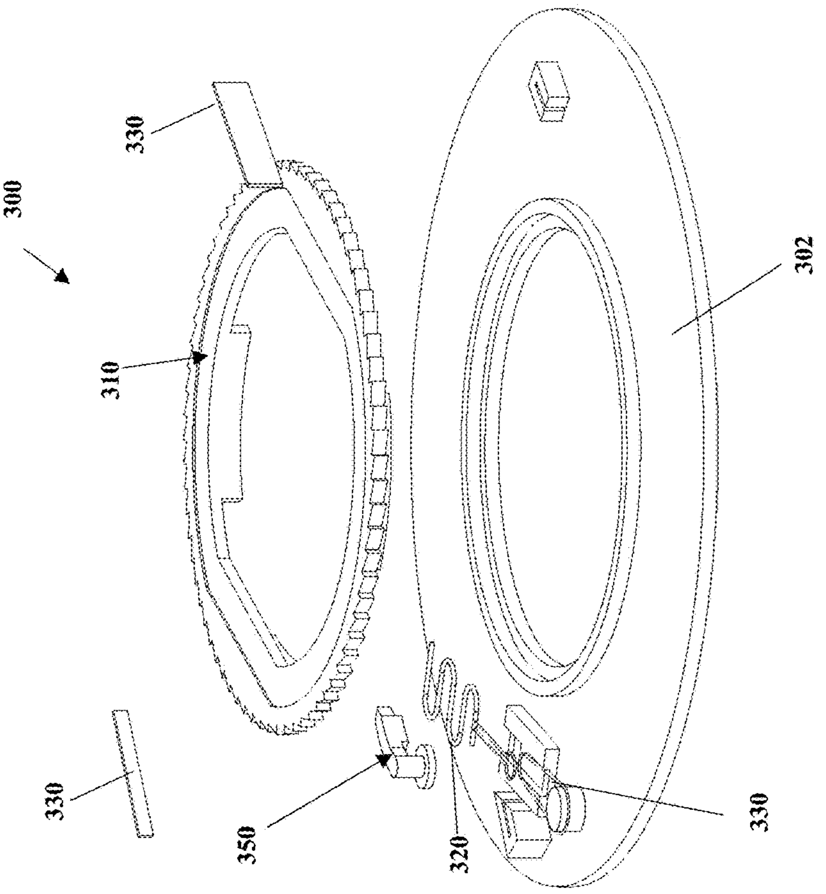

FIGS. 7-8 show one embodiment for an actuation system 300. The actuation system comprises a toothed disc 310 rotated by a ratchet mechanism disposed on a base structure 302. The actuator is a shape memory alloy wire 310, shaped as a flat spring for larger displacement. The current mechanism permits 2.5 deg rotations over the whole 360 degrees range. Additionally, a compliant plastic rod 330, a rubber band 340, and a pawl 350 are used to replace the usual springs required for such mechanisms. The advantage of such substitution is to eliminate any metallic components that might interfere with the antenna's performance.

Figure 9A:
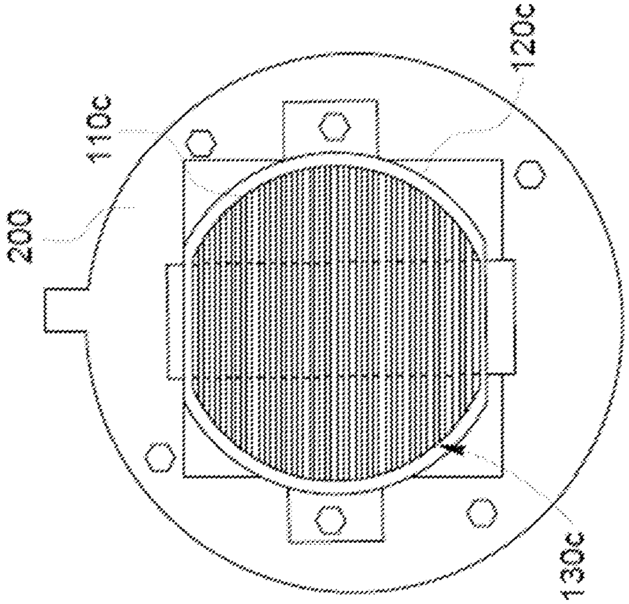
FIG. 9A is a top view of a photograph of a Fabricated Prototype of FIG. 5.
Figure 9B:
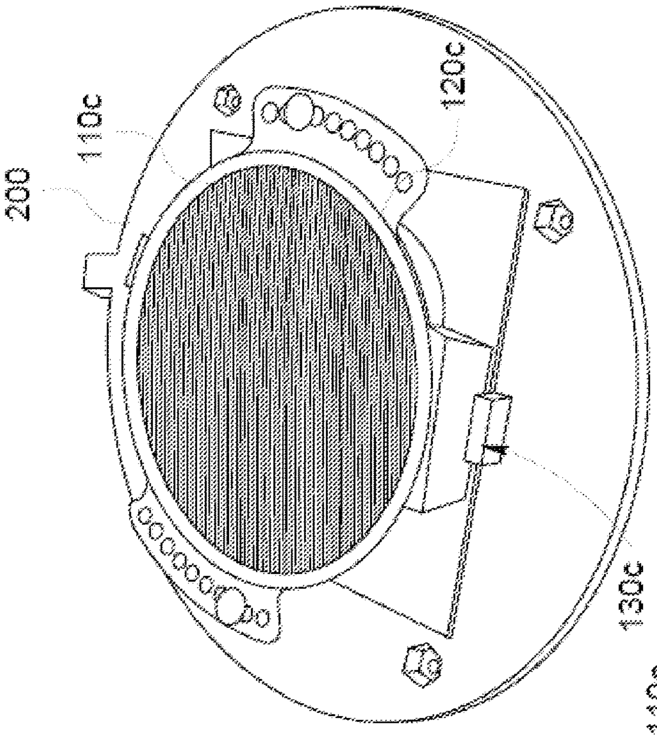
FIG. 9B is a perspective view of a photograph of a Fabricated Prototype of FIG. 5.
Figure 9C:
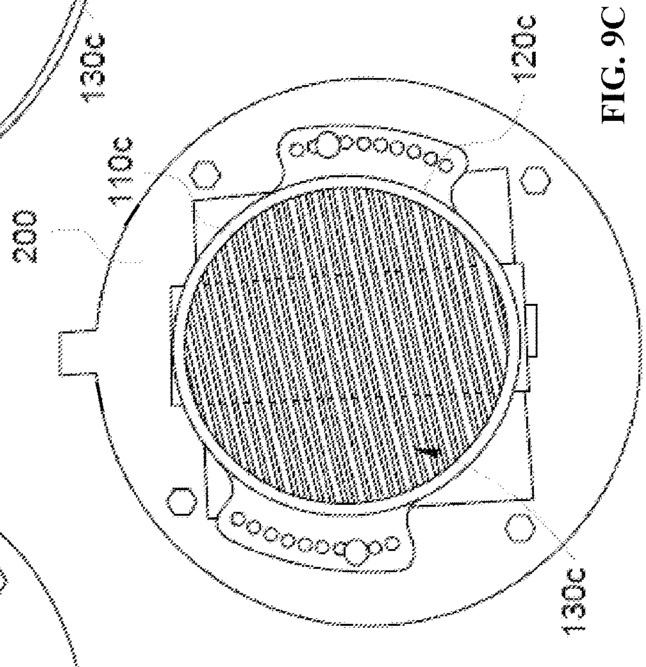
FIG. 9C is a top view of a photograph of a Fabricated Prototype of FIG. 5 with the top layer rotated.

FIG. 9A-9C is a fabricated prototype of the FIG. 5 embodiment. The plastic components are 3D printed and the foam pieces, in addition to the locking mechanisms using the nylon screws, ensure the best contact between the two moiré patches. This guarantees that the results are repeatable and match the simulations.

Figure 10:
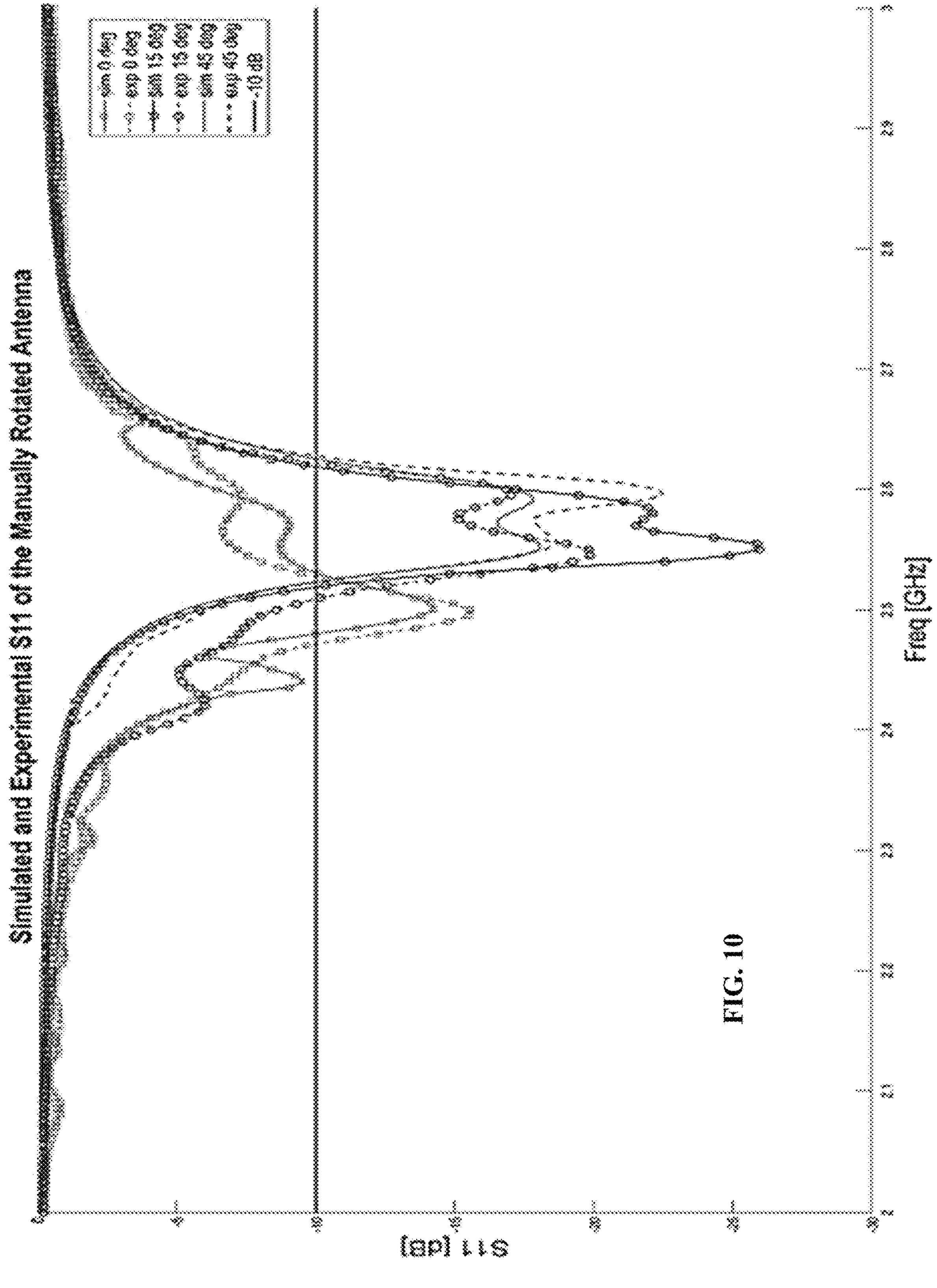
FIG. 10 is a graph of an S11 plot showing the experimental and simulated result of the fabricated prototype of FIG. 9 at about 0 deg, about 15 deg, and about 45 deg respectively.

FIG. 10 is an S11 plot showing the experimental and simulated result of the fabricated prototype of FIG. 14 at about 0 deg, about 15 deg, and 4 about 5 deg respectively. The results show a shift in the bandwidth, indicating a tuning of the operating frequencies between 0 deg rotation and the other rotation angles. The operating frequencies are at 0 deg: about 2.47 GHz to about 2.52 GHz and at the other frequencies: about 2.50 GHz to about 2.64 GHz.

Figure 11A:
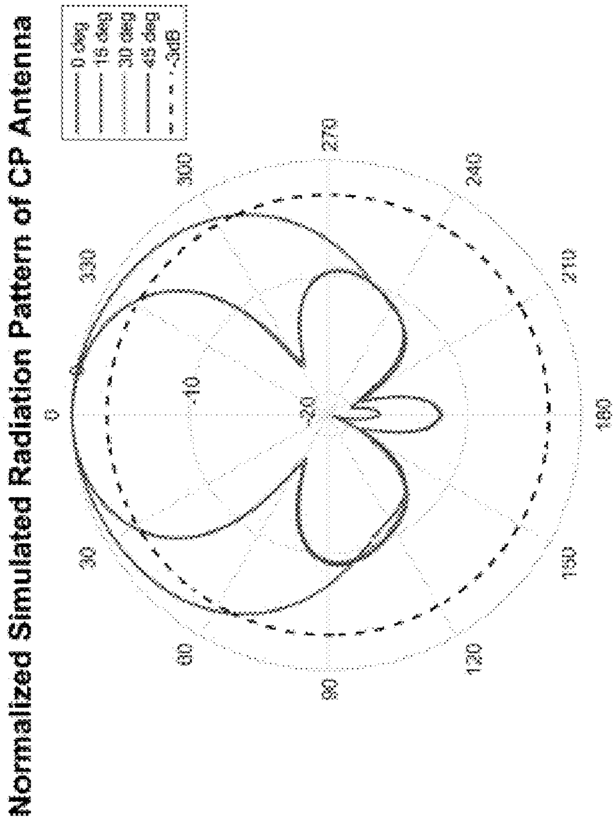
FIGS. 11A-11B are graphs containing plots showing the normalized simulated and experimental radiation patterns of the fabricated plastic prototype of FIG. 9 from 0 about deg to about 45 deg respectively.
Figure 11B:
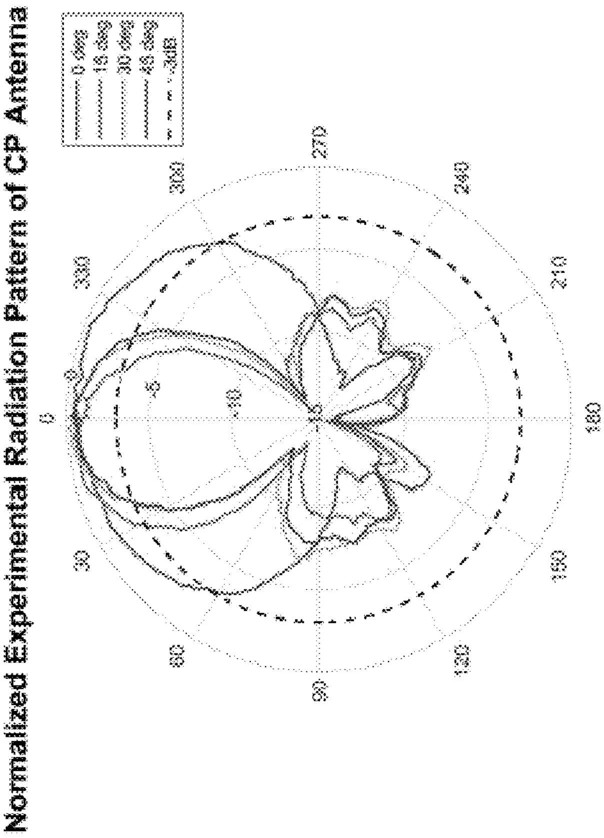
Figure 12B:
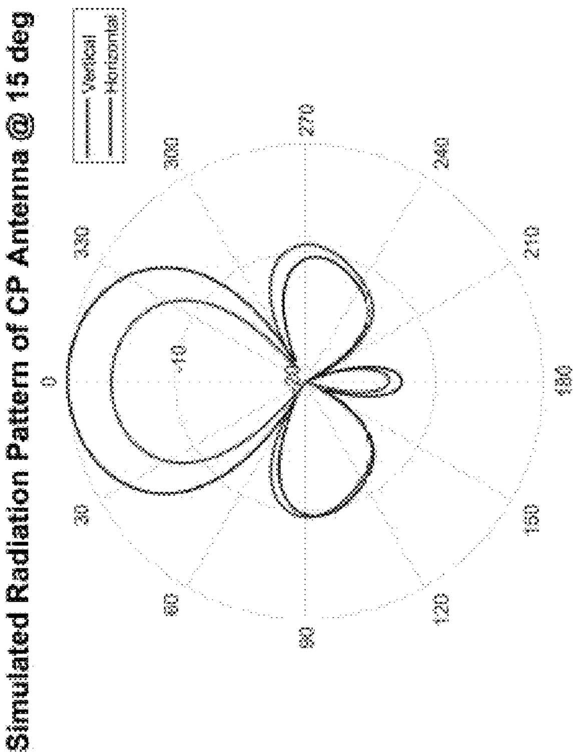
FIGS. 12A-12D contain plots showing the simulated radiation patterns of the fabricated prototype of FIG. 9 at about 0 deg, about 15 deg, about 30 deg, and about 45 deg respectively.
Figure 12A:
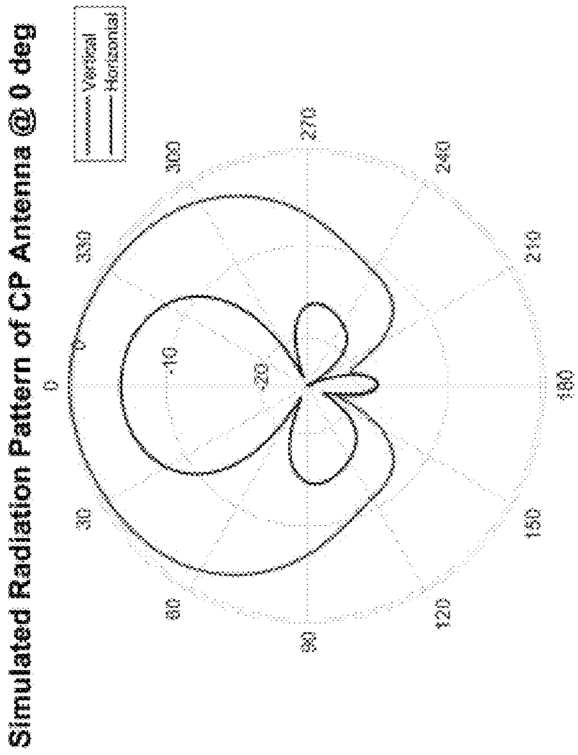
Figure 12D:
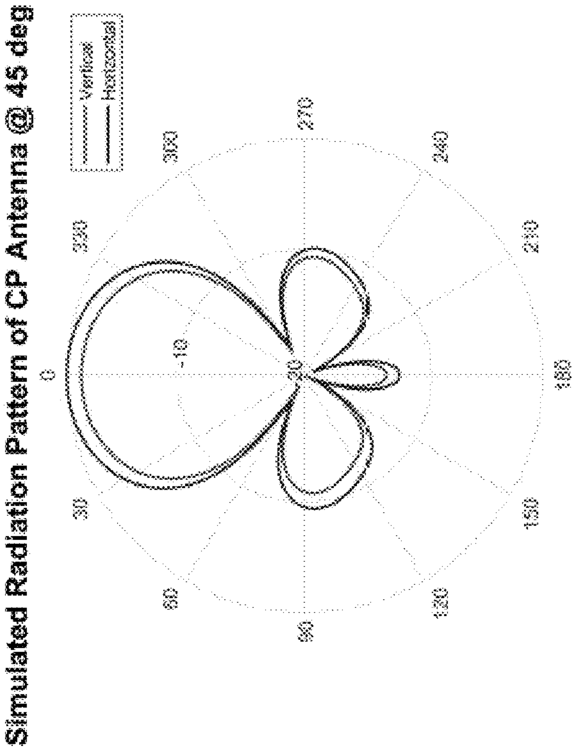
Figure 12C:
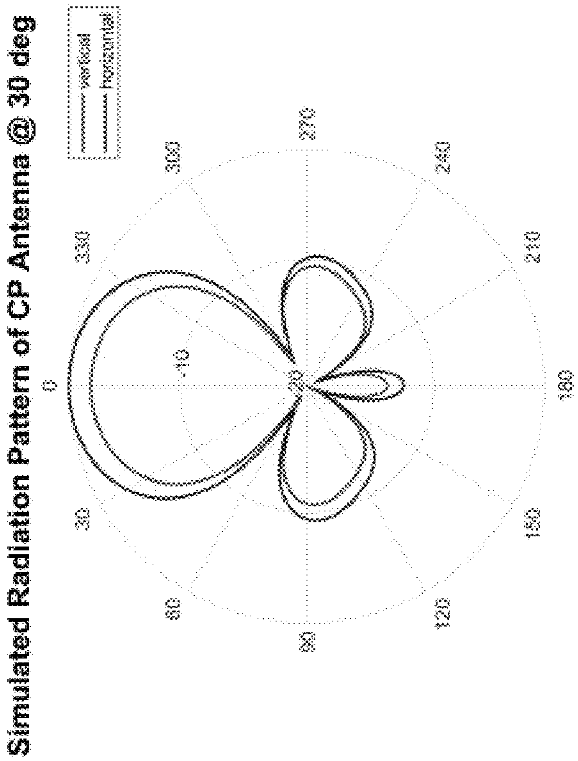
Figure 13A:
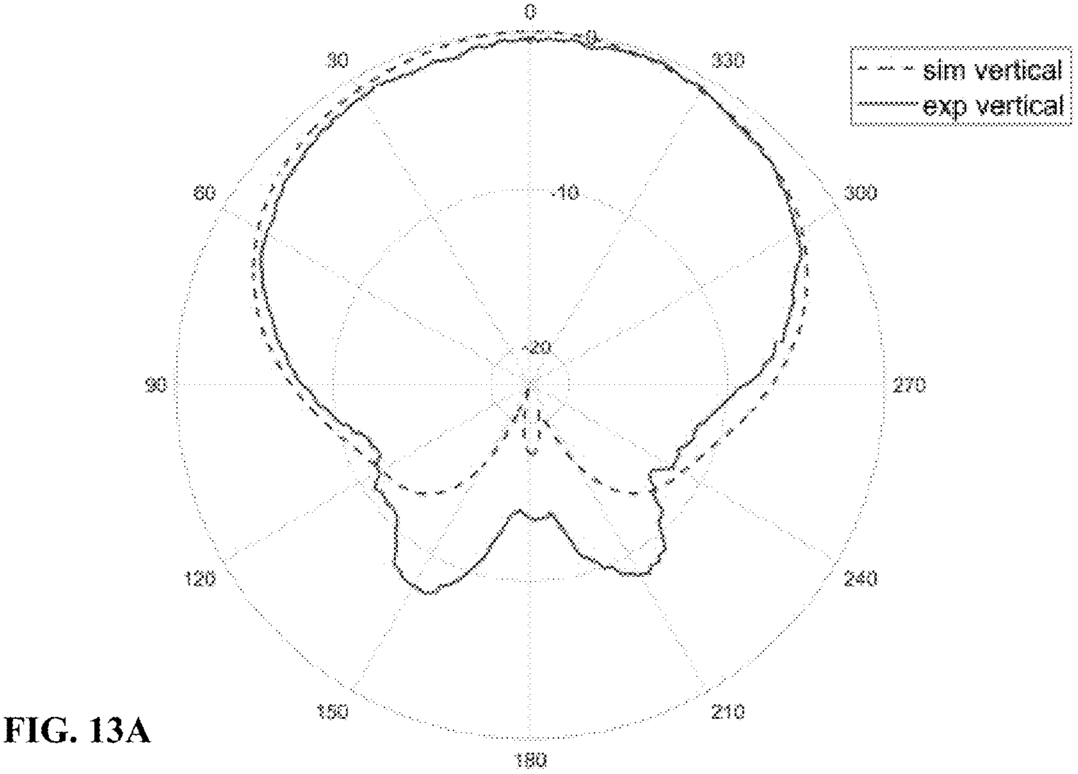
FIGS. 13A-13H are graphs that contain plots showing the vertical and horizontal components of the normalized experimental and simulated radiation patterns of the fabricated plastic prototype of FIG. 9 at about 0 deg, about 15 deg, about 30 deg, and about 45 deg respectively.
Figure 13B:
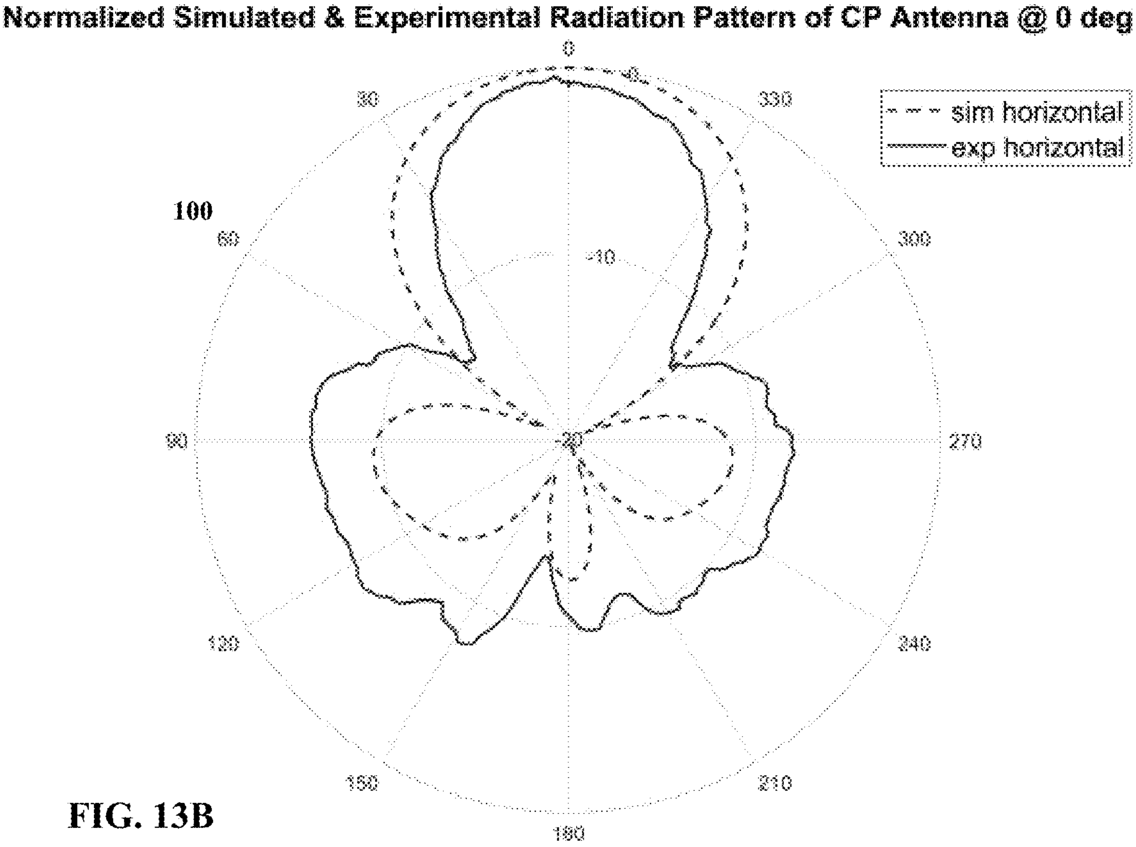
Figure 13C:
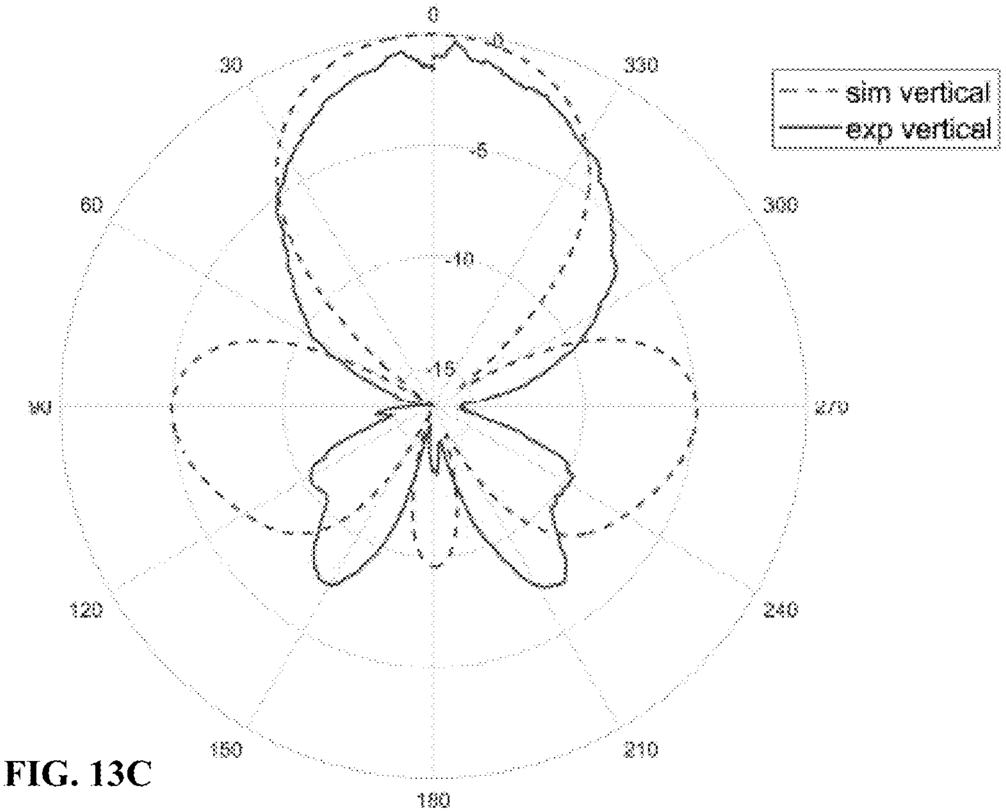
Figure 13D:
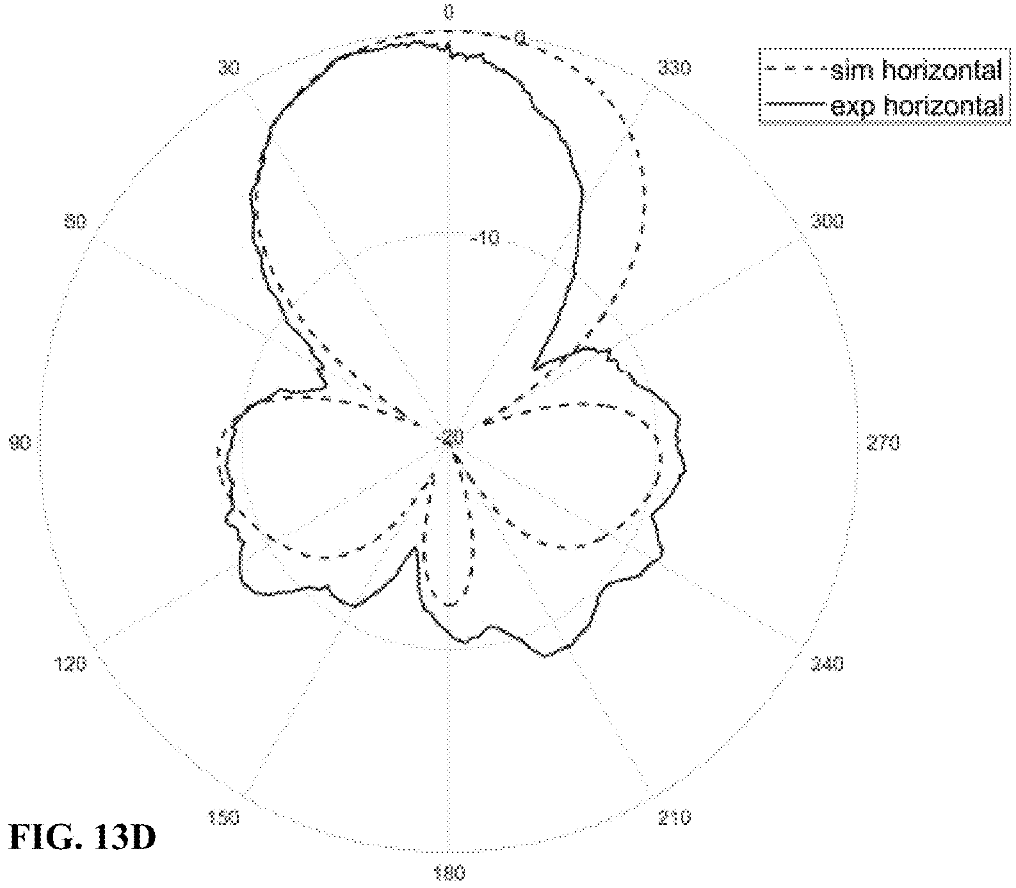
Figure 13E:
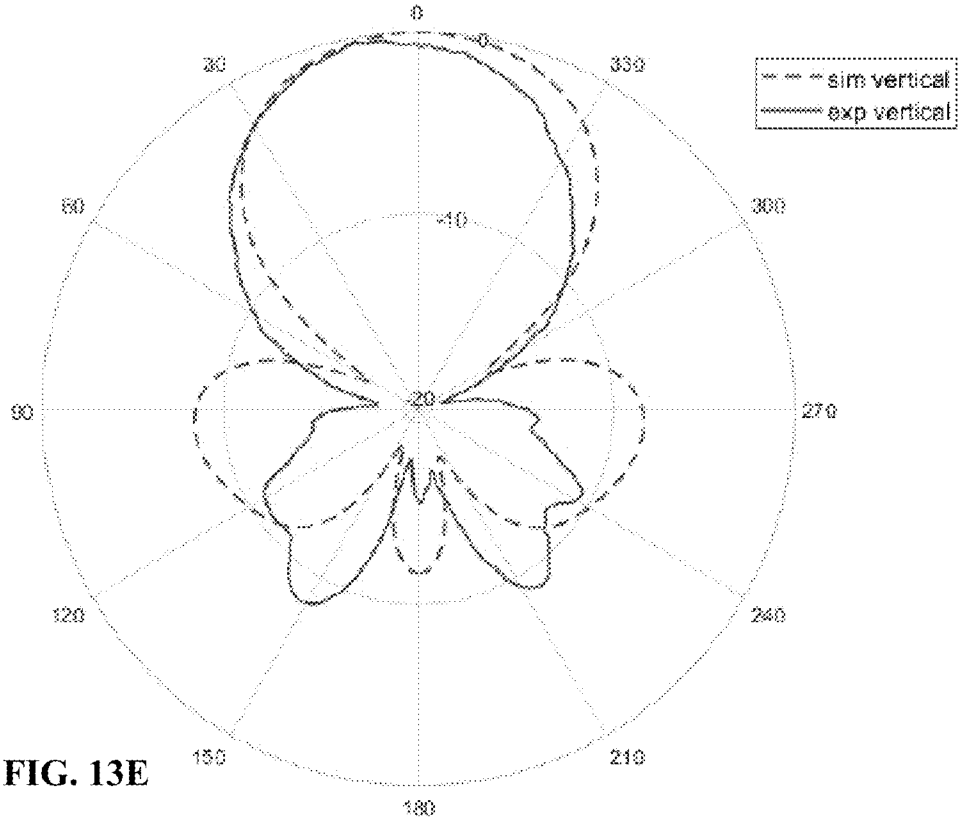
Figure 13F:
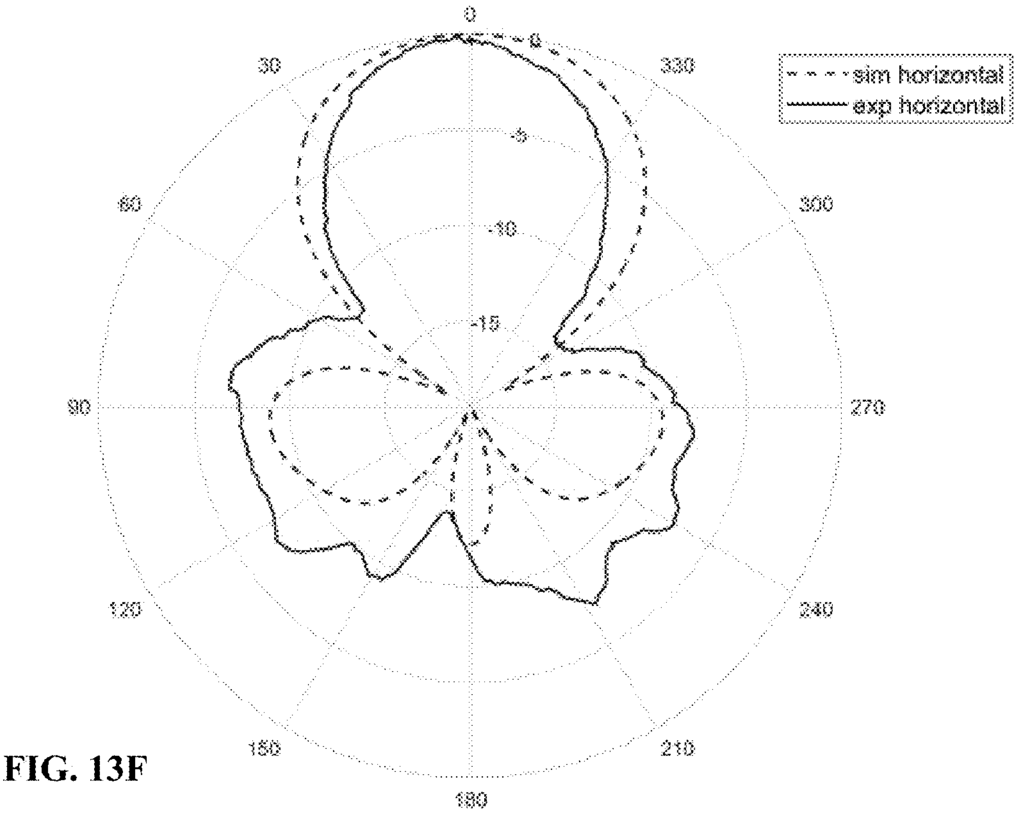
Figure 13G:
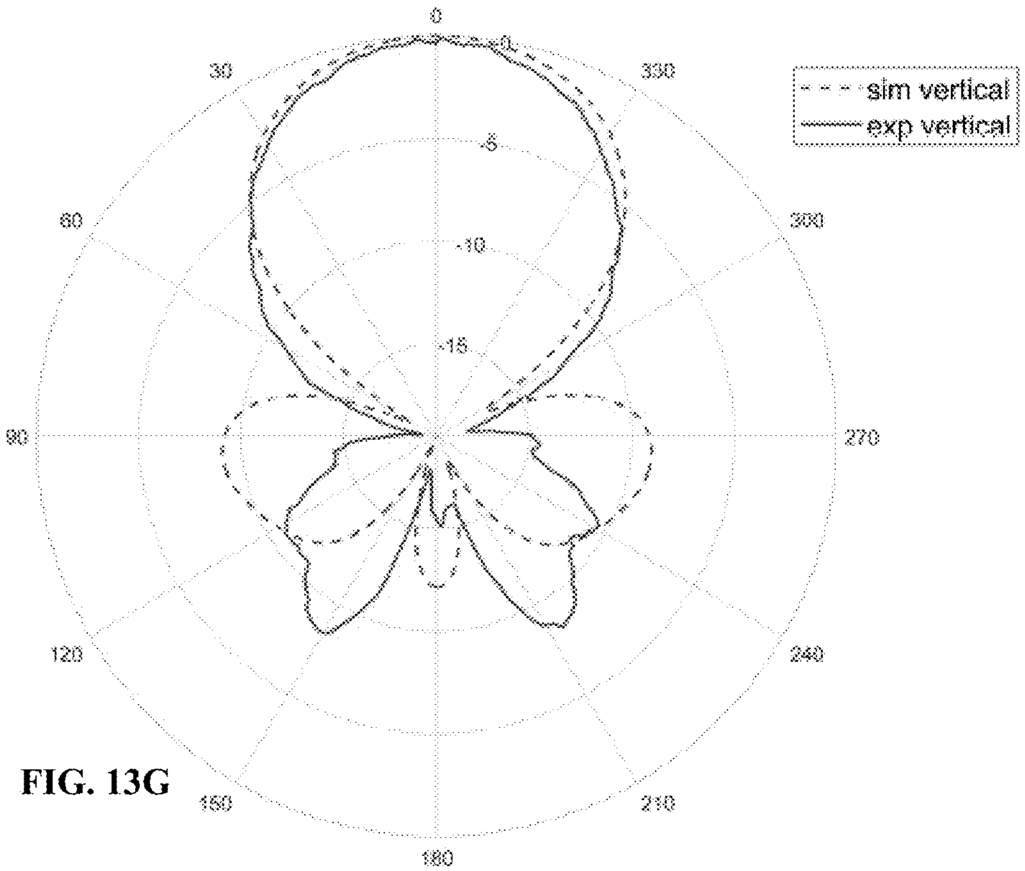
Figure 13H:
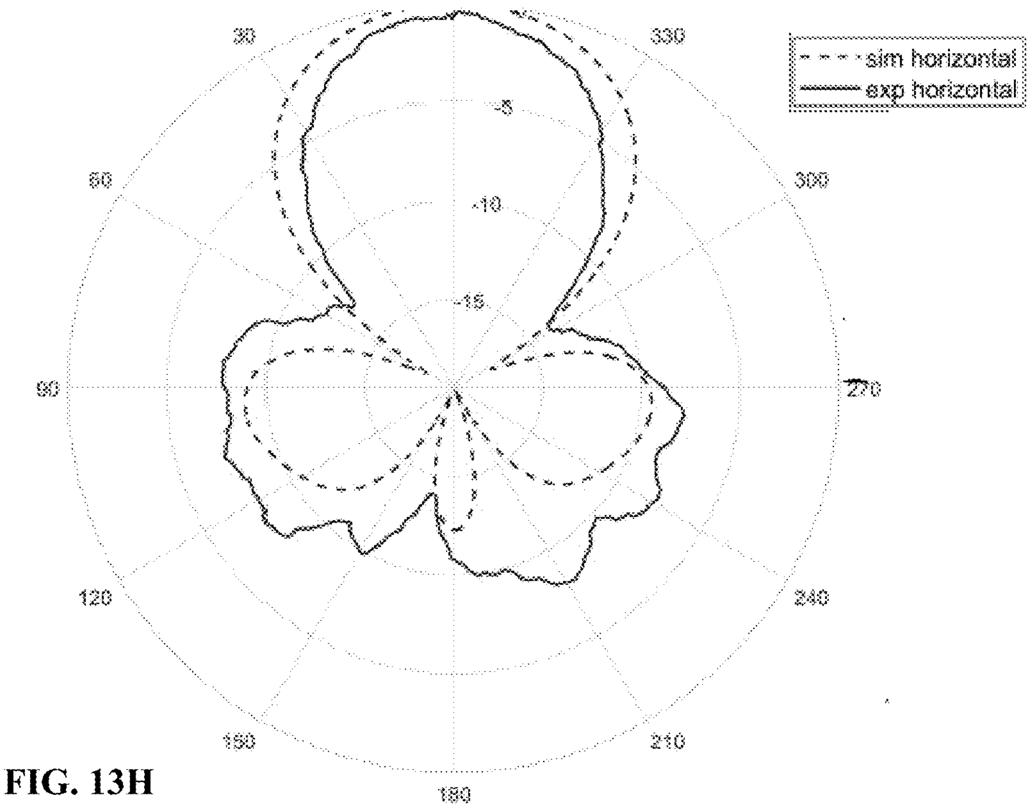
Figure 14A:
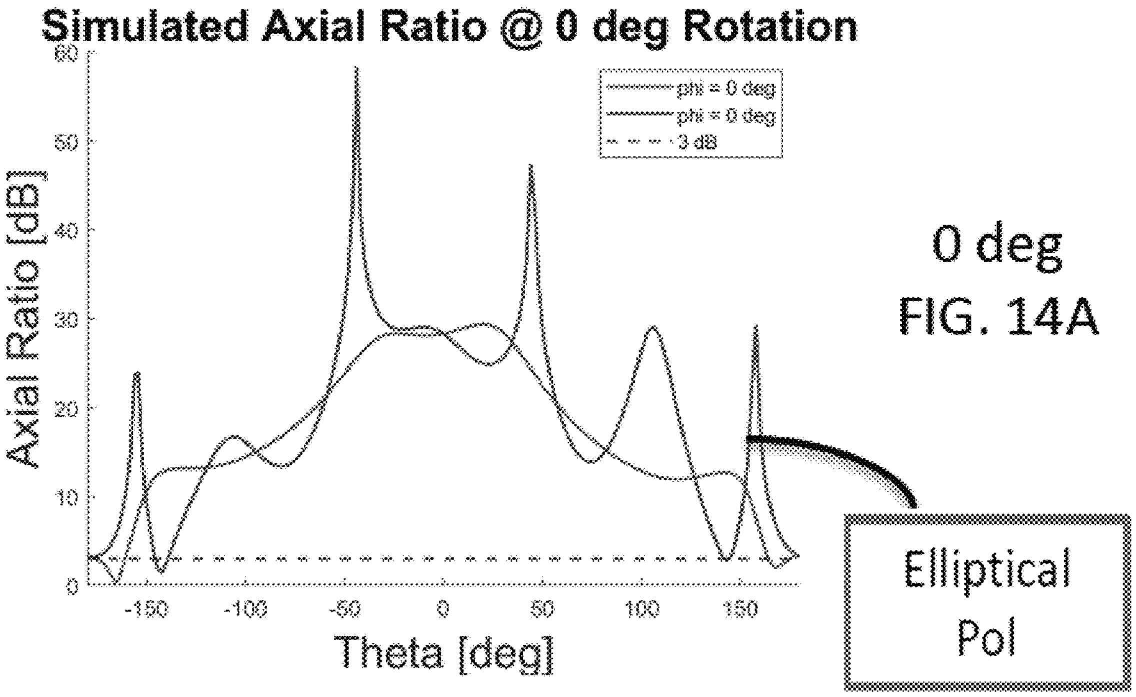
FIGS. 14A-14D are graphs that contain plots showing the simulated axial ratio of the fabricated plastic prototype of FIG. 9 at about 0 deg, about 15 deg, about 30 deg, and about 45 deg, respectively.
Figure 14B:
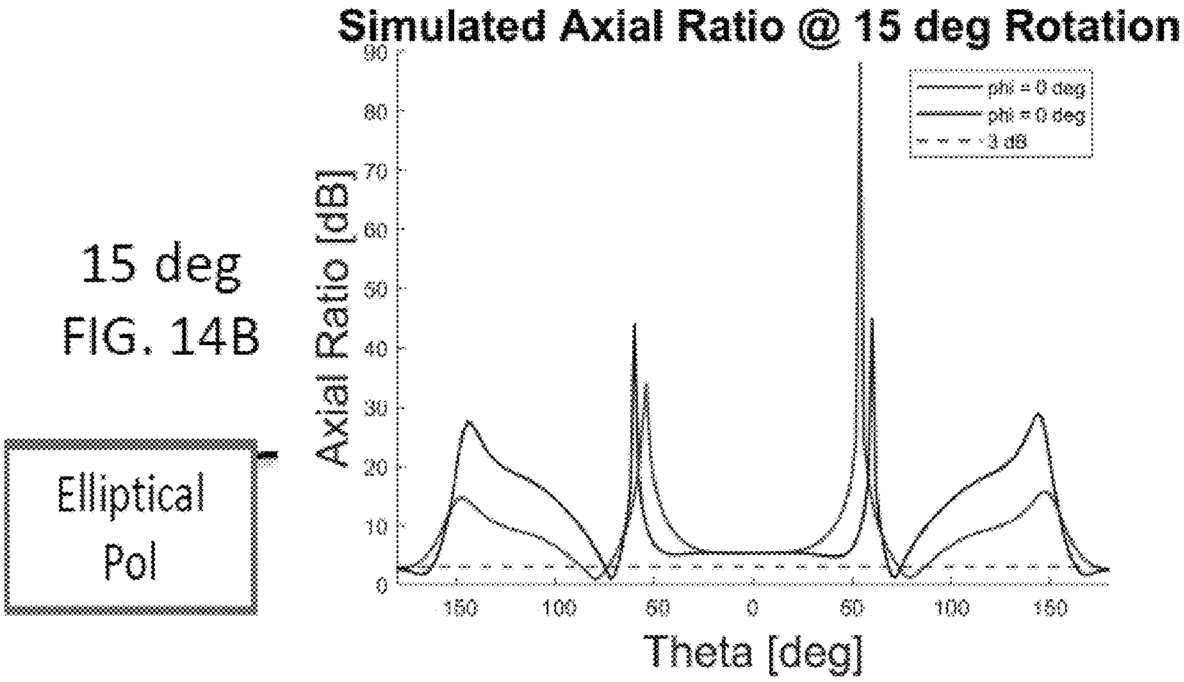
Figure 14C:
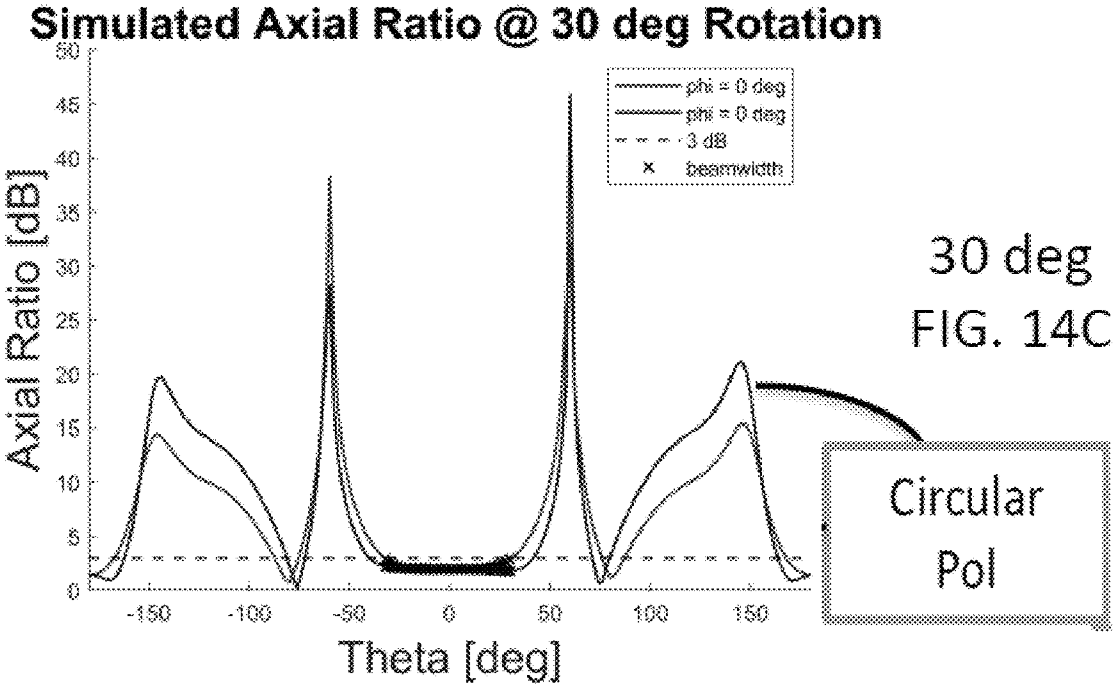
Figure 14D:
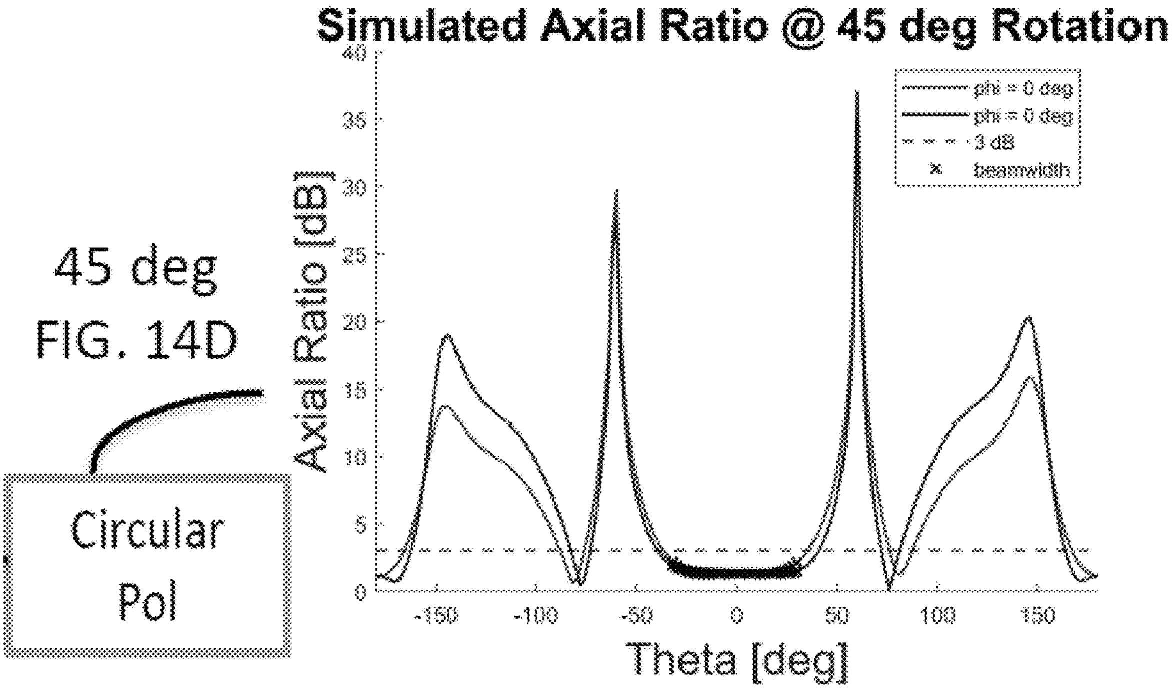

FIGS. 11A and 11B show the normalized experimental and simulated vertical radiation patterns of the fabricated plastic prototype of FIG. 9 at about 0 deg and about 45 deg respectively. It can be observed that the rotation of the patch from about 0 deg to about 45 deg focused the emitted beam, where the beamwidth decreased from around about 130 deg at about 0 deg rotation to around about 64 deg at about 15 deg, about 30 deg and about 45 deg rotations. The radiation patterns obtained are typical patch antenna radiation pattern. They have no specific description. In addition, this technique is able to alter any other type of radiation pattern.

FIGS. 12A-12D show the simulated radiation patterns of the fabricated prototype of FIG. 9 at about 0 deg, about 15 deg, about 30 deg, and about 45 deg respectively. At about 0 deg rotation, the antenna has an elliptical polarization where the vertical component is dominant, whereas at about 15 deg rotation, although the polarization is still elliptical, the horizontal component is now dominant. Finally, at about 30 deg and about 45 deg, the antenna becomes circularly polarized. These results demonstrate the polarization and radiation pattern reconfiguration capabilities of the mechanically reconfigurable patch antenna system.

FIGS. 13A-13H show the vertical and horizontal components of the normalized experimental and simulated radiation patterns of the fabricated plastic prototype of FIG. 9 at about 0 deg, about 15 deg, about 30 deg, and about 45 deg respectively. The experimental results show a good match with the simulations.

FIGS. 14A-14D show the simulated axial ratio of the fabricated plastic prototype of FIG. 9 at about 0 deg (about 2.5 GHz), about 15 deg (about 2.56 GHz), about 30 deg (about 2.56 GHz), and about 45 deg (about 2.56 GHz) respectively. The values axial ratio verify that at about 0 deg and about 15 deg, the antenna has an elliptical polarization, whereas at about 30 deg and about 45 deg, the axial ratio values, which are below about 3 dB throughout the beamwidth of the antenna, verify the circular polarization of the antenna.

EXAMPLES

The previous examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

REFERENCES

[1] X. Liu, C. L. Zekios, and S. V. Georgakopoulos, "Analysis of a packable and tunable origami multi-radii helical antenna," IEEE Access, vol. 7, pp. 13003-13014, 2019

[2] Y. Tawk, "Physically controlled cubesat antennas with an adaptive frequency operation," IEEE Antennas and Wireless Propagation Letters, vol. 18, no. 9, pp. 1892-1896, 2019.

[3] L. H. Blumenschein, L. T. Gan, J. A. Fan, A. M. Okamura, and E. W. Hawkes, "A tip-extending soft robot enables reconfigurable and deployable antennas," IEEE Robotics and Automation Letters, vol. 3, no. 2, pp. 949-956, 2018.

[4] H. Zhu, X. Liu, S. Cheung, and T. Yuk, "Frequency-reconfigurable antenna using metasurface," IEEE Transactions on Antennas and Propagation, vol. 62, no. 1, pp. 80-85, 2013.

[5] H. L. Zhu, S. W. Cheung, and T. I. Yuk, "Mechanically pattern reconfigurable antenna using metasurface," IET Microwaves, Antennas & Propagation, vol. 9, no. 12, pp. 1331-1336, 2015.

[6] D. Rodrigo, L. Jofre, and B. A. Cetiner, "Circular beam-steering reconfigurable antenna with liquid metal parasitics," IEEE transactions on antennas and propagation, vol. 60, no. 4, pp. 1796-1802, 2012.

[7] Mehdipour, T. A. Denidni, A.-R. Sebak, C. W. Trueman, I. D. Rosca, and S. V. Hoa, "Mechanically reconfigurable antennas using an anisotropic carbon-fibre composite ground," IET Microwaves, Antennas & Propagation, vol. 7, no. 13, pp. 1055-1063, 2013

[8] A. Boukarkar, X. Q. Lin, Y. Jiang, Y. J. Chen, L. Y. Nie, and P. Mei, "Compact mechanically frequency and pattern reconfigurable patch antenna," IET Microwaves, Antennas & Propagation, vol. 12, no. 11, pp. 1864-1869, 2018

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A mechanically reconfigurable antenna radiator system comprising: an antenna and a moiré radiation pattern actuated by a low power actuation mechanism; wherein the moiré radiation pattern includes an intersection of repeated patterns altering the antenna's characteristics including tuning the operating frequency, changing the antenna moiré radiation pattern, and altering the antenna's polarization between an elliptical or circular polarization; wherein the low power actuation mechanism comprises a small mechanical motion to create a geometric variation in the moiré radiation pattern to significantly change the antenna's characteristics; the small mechanical motion comprises a fixed rotation to change the polarization of the antenna or reconfigure the radiation pattern; the rotational change allows for continuous steering of the radiation pattern of the antenna with fine tuning over a 360° range; and the low power actuation mechanism is a ratchet mechanism driven by a shape memory alloy actuator.

2. The system of claim 1, wherein the shape memory alloy actuator rotates at least 5 degrees.

3. The system of claim 2, wherein the intersection of repeated patterns overshadows a single patch or two or more patches.

4. The system of claim 3, wherein the patches of the repeated patterns comprise a layered superposition of two different materials.

5. The system of claim 3, wherein the patches of the repeated patterns comprise a union pattern obtained by rotation, translation, or any other transformation to overshadow the radiating patches.

6. The system of claim 3, further comprising a supporting structure can be of any material, including but not limited to, plastic, nylon, and foam.

7. The system of claim 3, wherein the antenna is used in any telecommunication application including WIFI, Bluetooth, LTE, satellite to satellite communication, satellite to Earth communication, wireless media, or any space communication systems.

8. A method of mechanically reconfiguring an antenna radiator system comprising: operably coupling an antenna and a moiré radiation pattern to actuated by a low power actuation mechanism, wherein low power is less power required by a DC motor; including an intersection of repeated patterns altering the antenna's characteristics on the antenna moiré radiation pattern; and tuning the operating frequency, changing the antenna radiation pattern, and altering the antenna's polarization between an elliptical or circular polarization; a small mechanical motion on the low power actuation mechanism to create a geometric variation in the moiré radiation pattern to significantly change the antenna's characteristics; the small mechanical motion comprises a fixed rotation to change the polarization of the antenna or reconfigure the radiation pattern; the rotational change allows for continuous steering of the radiation pattern of the antenna with fine tuning over a 360° range; and the low power actuation mechanism is a ratchet mechanism driven by a shape memory alloy actuator.

9. The method of claim 8, wherein the intersection of repeated patterns overshadow a single patch or two or more patches.

10. The method of claim 9, wherein the patches of the repeated patterns comprise a copper on top of a dielectric material.

* * * * *